United States Patent
Matozaki et al.

(10) Patent No.: US 10,960,479 B2
(45) Date of Patent: Mar. 30, 2021

(54) WIRE GUIDE DEVICE OF WIRE ELECTRICAL DISCHARGE MACHINE AND WIRE ELECTRICAL DISCHARGE MACHINE

(71) Applicant: Mitsubishi Electric Corporation, Chiyoda-ku (JP)

(72) Inventors: Toshiya Matozaki, Tokyo (JP); Rintaro Nagaoka, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 182 days.

(21) Appl. No.: 16/316,255

(22) PCT Filed: May 31, 2017

(86) PCT No.: PCT/JP2017/020276
§ 371 (c)(1),
(2) Date: Jan. 8, 2019

(87) PCT Pub. No.: WO2018/055837
PCT Pub. Date: Mar. 29, 2018

(65) Prior Publication Data
US 2019/0210131 A1  Jul. 11, 2019

(30) Foreign Application Priority Data
Sep. 20, 2016 (JP) .............................. JP2016-183350

(51) Int. Cl.
*B23H 7/10* (2006.01)

(52) U.S. Cl.
CPC ............... *B23H 7/105* (2013.01); *B23H 7/10* (2013.01)

(58) Field of Classification Search
CPC .................................. B23H 7/10; B23H 7/105
See application file for complete search history.

(56) References Cited

U.S. PATENT DOCUMENTS

| 4,733,038 A | * | 3/1988 | Girardin | ................... | B23H 7/10 |
| | | | | | 219/137.61 |
| 4,803,326 A | * | 2/1989 | Kiyoshi | ................... | B23H 7/10 |
| | | | | | 219/69.12 |
| 5,319,175 A | * | 6/1994 | Truty | ..................... | B23H 7/107 |
| | | | | | 219/69.12 |

FOREIGN PATENT DOCUMENTS

| CN | 1775442 A | 5/2006 |
| CN | 202192346 U | 4/2012 |
| JP | 4-101726 A | 4/1992 |

(Continued)

OTHER PUBLICATIONS

International Search Report dated Aug. 15, 2017 in PCT/JP2017/020276 filed on May 31, 2017.

(Continued)

*Primary Examiner* — Geoffrey S Evans
(74) *Attorney, Agent, or Firm* — Xsensus LLP (57) ABSTRACT

A wire guide device of a wire electrical discharge machine includes a first roller shaft, a first wire guide roller provided at an end of the first roller shaft, a second roller shaft, and a second wire guide roller provided at an end of the second roller shaft and having an end face in an axial direction provided to face an end face of the first wire guide roller in the axial direction. The first wire guide roller and the second wire guide roller have a conical surface and a conical surface with which a wire electrode is in contact.

16 Claims, 9 Drawing Sheets

(56) References Cited

FOREIGN PATENT DOCUMENTS

JP            2677756 B2     11/1997
JP     2007167976 A  *   7/2007

OTHER PUBLICATIONS

Combined Chinese Office Action and Search Report dated Feb. 3, 2020 in Patent Application No. 201780056150.6 (with English translation of the Office Action and English translation of categories of cited documents), 17 pages.

* cited by examiner

WIRE GUIDE DEVICE OF WIRE ELECTRICAL DISCHARGE MACHINE AND WIRE ELECTRICAL DISCHARGE MACHINE

FIELD

The present invention relates to a wire guide device of a wire electrical discharge machine and the wire electrical discharge machine.

BACKGROUND

A wire electrical discharge machine includes a feed roller for sending out a new wire electrode and a wire electrode collection roller for collecting a used wire electrode. When a wire electrode is fed from the feed roller to the wire electrode collection roller, the wire electrical discharge machine applies a constant inter-electrode voltage between the wire electrode and a workpiece, which are used as electrodes, thereby producing electrical discharges between the electrodes to machine the workpiece into a desired shape while relatively moving the wire electrode and the workpiece with the wire electrode being tensioned.

In an early stage of electrical discharge machining, rough machining is performed. Rough machining is machining to cut a machining allowance as much as possible in one-time machining to cut out to a rough shape. A wire electrode with a diameter of 0.35 mm to 0.10 mm is used in rough machining, and the wire electrical discharge machine controls the tension of the wire electrode, the feed speed, and the amount of current supplied for electrical discharge machining during the rough machining. This allows continuous machining without a break in the wire electrode. In a final stage of the electrical discharge machining, finish machining is performed. In finish machining, in which the amount of machining of a workpiece is smaller than that in rough machining, the remainder on a machined surface after rough machining can be cut to improve surface accuracy, or a corner radius (R) of a workpiece can be minimized. The corner R means roundness at a corner of the workpiece. As a wire electrode at the time of finish machining, an ultrafine wire electrode with a diameter of 0.03 mm to 0.01 mm smaller than the diameter of the wire electrode used for rough machining is used.

The wire electrical discharge machine ordinarily uses a set of reference dies called diamond dies that are disposed immediately above and below a workpiece. Each diamond die has a hole with a slight clearance with respect to the diameter of a wire electrode. Therefore, when the wire electrode is changed for a change from rough machining to finish machining, or when the wire electrode is changed for a change from finish machining to rough machining, a change between diamond dies having a hole appropriate to the wire electrode used for rough machining and diamond dies having a hole appropriate to the wire electrode used for finish machining is required. In other words, the wire electrical discharge machine cannot perform machining continuously from rough machining to finish machining without changing the diamond dies provided in a wire electrode feed mechanism, or without adjusting a reference position in which the wire electrode is fed.

Patent Literature 1 discloses a technique for stabilizing wire feed using a mechanism other than diamond dies. In Patent Literature 1, the outer peripheral surface of each of two guide rollers is provided with a circumferential groove that is an annular groove portion continuing in the rotational direction of the guide roller, and the two guide rollers provided with the circumferential grooves are in contact with each other at their outer peripheral surfaces so that their circumferential grooves are opposed to each other. A wire electrode is passed through a circular space formed by each other's circumferential grooves in contact. The conventional art disclosed in Patent Literature 1 is directed to a structure in which the feed speed of the wire electrode and the rotational speed of the guide roller are matched with each other to stably feed the wire electrode.

CITATION LIST

Patent Literature

Patent Literature 1: Japanese Patent No. 2677756

SUMMARY

Technical Problem

However, in the conventional art disclosed in Patent Literature 1, a dimension of the circular space formed by the circumferential grooves of the two guide rollers must be made equal to the diameter of the wire electrode. When the diameter of the wire electrode is changed in the middle of the machining process, work of changing to dedicated guide rollers appropriate to the diameter of the changed wire electrode is required, causing a problem that continuous machining cannot be performed without stopping the machine.

The present invention has been made in view of the above circumstances, and it is an object of the present invention to provide a wire guide device of a wire electrical discharge machine, which allows continuous machining without work of changing a guide roller at the time of changing to a new wire electrode having a different diameter.

Solution to Problem

In order to solve the above-mentioned problems and achieve the object, the present invention provides a wire guide device of a wire electrical discharge machine, comprising: a first roller shaft; a first wire guide roller disposed coaxially with the first roller shaft and provided at an end of the first roller shaft; a second roller shaft; and a second wire guide roller disposed coaxially with the second roller shaft and provided at an end of the second roller shaft, the second wire guide roller having an end face in an axial direction provided to face an end face of the first wire guide roller in the axial direction, wherein the first wire guide roller and the second wire guide roller each have a conical surface with which a wire electrode is in contact.

Advantageous Effects of Invention

The wire guide device of the wire electrical discharge machine of the present invention achieves an advantageous effect of allowing continuous machining without work of changing a guide roller at the time of changing to another wire electrode with a different diameter.

DESCRIPTION OF EMBODIMENT

Hereinafter, a wire guide device of a wire electrical discharge machine and the wire electrical discharge machine according to an embodiment of the present invention will be described in detail with reference to the drawings. Note that the invention is not necessarily limited by the embodiment.

Embodiment

Figure 1:
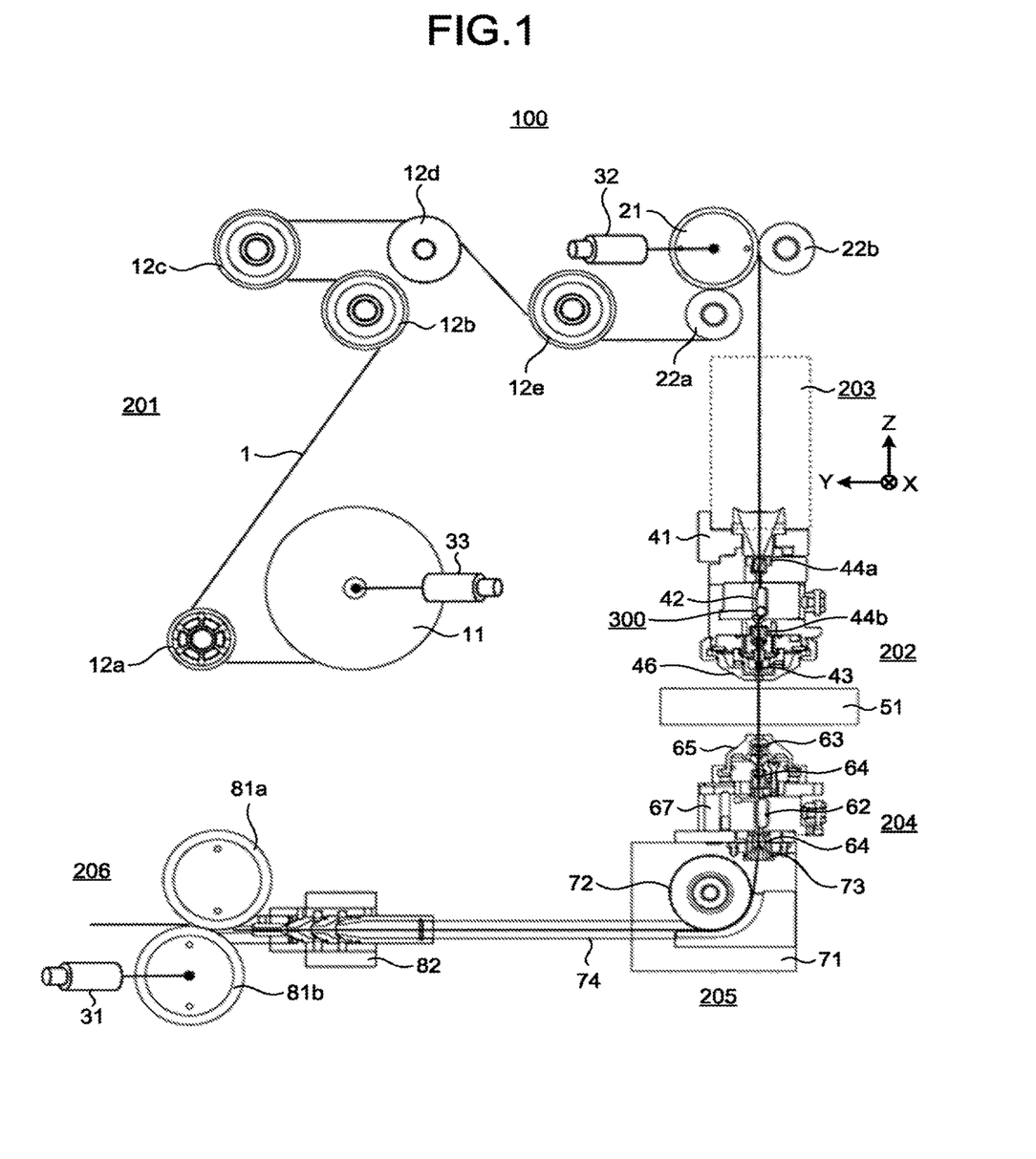
FIG. 1 is a configuration diagram of a wire guide device of a wire electrical discharge machine according to an embodiment of the present invention.

FIG. 1 is a configuration diagram of a wire guide device of a wire electrical discharge machine according to an embodiment of the present invention. A wire electrical discharge machine 100 illustrated in FIG. 1 includes a wire electrode holding unit 201, an upper wire electrode guide unit 202, a wire electrode automatic connection device 203, a lower wire electrode guide unit 204, a wire electrode feed unit 205, and a wire electrode collection unit 206. The upper wire electrode guide unit 202 includes a wire guide device 300 according to the embodiment of the present invention. Details of the structure of the wire guide device 300, which is a characteristic part of the present invention, will be described later. In FIG. 1, in XYZ coordinates of a right-handed system, a vertical direction of the wire electrical discharge machine 100 is defined as a Z-axis direction, a direction orthogonal to the Z-axis direction is defined as an X-axis direction, and a direction orthogonal to both the Z-axis direction and the X-axis direction is defined as a Y-axis direction. The same applies to the drawings after FIG. 1.

The wire electrode holding unit 201 includes a wire electrode bobbin 11 around which a wire electrode 1 is wound and held, a plurality of pulleys 12a, 12b, 12c, 12d, and 12e that changes the feed direction of the wire electrode 1, a feed roller 21 that sends out the wire electrode 1, and a plurality of feed pinch rollers 22a and 22b that wind the wire electrode 1 around the feed roller 21.

The upper wire electrode guide unit 202 includes: an upper feed element 42 that contacts the wire electrode 1 to supply electric current to the wire electrode 1; a pair of upper guides 44a and 44b disposed on upper and lower sides of the upper feed element 42, respectively, which guides the wire electrode 1 so that the wire electrode 1 contacts the upper feed element 42; an upper machining fluid nozzle 46 disposed on the lower side of the upper guides 44a and 44b, which sprays a machining fluid on a workpiece 51 during electrical discharge machining; an upper die 43 disposed at an ejection orifice of the upper machining fluid nozzle 46, which positions the wire electrode 1 during electrical discharge machining; and an upper guide block 41 holding them.

The wire electrode automatic connection device 203 has a guide pipe (not illustrated) disposed between the feed roller 21 and the upper wire electrode guide unit 202, which guides the wire electrode 1 to the upper wire electrode guide unit 202.

The lower wire electrode guide unit 204 includes: a lower machining fluid nozzle 65 disposed below the upper wire electrode guide unit 202, which sprays the machining fluid on the workpiece 51 during electrical discharge machining; a lower die 63 disposed inside the lower machining fluid nozzle 65, which positions the wire electrode 1 during electrical discharge machining; a lower feed element 62 disposed below the lower die 63, which contacts the wire electrode 1 to supply electric current to the wire electrode 1; a pair of lower guides 64 disposed above and below the lower feed element 62, respectively, which guide the wire electrode 1 so that the wire electrode 1 contacts the lower feed element 62; and a lower guide block 67 holding the lower machining fluid nozzle 65, the lower die 63, the lower feed element 62, and the lower guides 64.

The wire electrode feed unit 205 includes: a lower roller 72 that changes the feed direction of the wire electrode 1; an aspirator 73 that produces a negative pressure for feeding the wire electrode 1 from the lower die 63 to the lower guide 64 and ejects the machining fluid; a lower guide pipe 74 that guides the wire electrode 1 to the wire electrode collection unit 206; and a lower roller block 71 that holds the lower roller 72, the aspirator 73, and the lower guide pipe 74.

The wire electrode collection unit 206 includes wire electrode collection rollers 81a and 81b that collects the wire electrode 1, and a collection pipe end 82 that collects the wire electrode 1 from which the fluid has been removed.

The operation of the wire electrical discharge machine 100 illustrated in FIG. 1 will be described. The wire electrode 1 preset on the wire electrode bobbin 11 is routed through the pulleys 12a, 12b, 12c, 12d, and 12e to be hung on the feed roller 21, and pressure is applied to the wire electrode 1 by the feed pinch rollers 22a and 22b so that no slippages occur between the feed roller 21 and the wire electrode 1 and the wire electrode 1 is sent out to the wire electrode automatic connection device 203.

The wire electrode 1 sent out to the upper wire electrode guide unit 202 is fed to the upper guide 44a, the upper feed element 42, the wire guide device 300, the upper guide 44b, and the upper die 43 in this order. On this occasion, a constant tension is applied to both ends of the wire electrode 1. Consequently, the wire electrode 1 is fed in a state where the electrode 1 is kept pressed against the upper guide 44a, the upper feed element 42, the wire guide device 300, the upper guide 44b, and the upper die 43.

The wire electrode 1 that has passed through the upper die 43 passes through a machined hole (not illustrated) formed in the workpiece 51, and further passes through the lower die 63 of the lower wire electrode guide unit 204. Thereafter, the wire electrode 1 passes through the lower guide 64, the lower feed element 62, and the lower guide 64, and after the wire electrode 1 is changed in feed direction 90 degrees by the lower roller 72, the wire electrode 1 passes through the lower guide pipe 74 and reaches the wire electrode collection unit 206.

The wire electrode 1 running under tension between the upper die 43 and the lower die 63 produces electrical discharge with the workpiece 51, thereby breaking the surface of the workpiece 51 by the electrical discharge. At the same time, the upper wire electrode guide unit 202 and the lower wire electrode guide unit 204 are subjected to movement control in the X and Y directions along a programmed machining path. In this way, the workpiece 51 is machined.

A portion of the wire electrode 1 which has undergone electrical discharge machining reaches the wire electrode collection unit 206, and is pressed by the wire electrode collection rollers 81a and 81b so as not to cause slippages and is ejected.

The feed roller 21 and the wire electrode collection roller 81b are provided with drive motors 31 and 32, respectively, and the wire electrical discharge machine 100 controls the feed speed and tension of the wire electrode 1 to keep a certain condition according to the machining. A shaft on which the wire electrode bobbin 11 is set is also provided with a drive motor 33, and the wire electrical discharge machine 100 performs control to produce a load according to a feed condition of the wire electrode 1 so that no deflection occurs in the wire electrode 1.

Hereinafter, the configuration of the wire guide device 300 will be described in detail.

Figure 2:
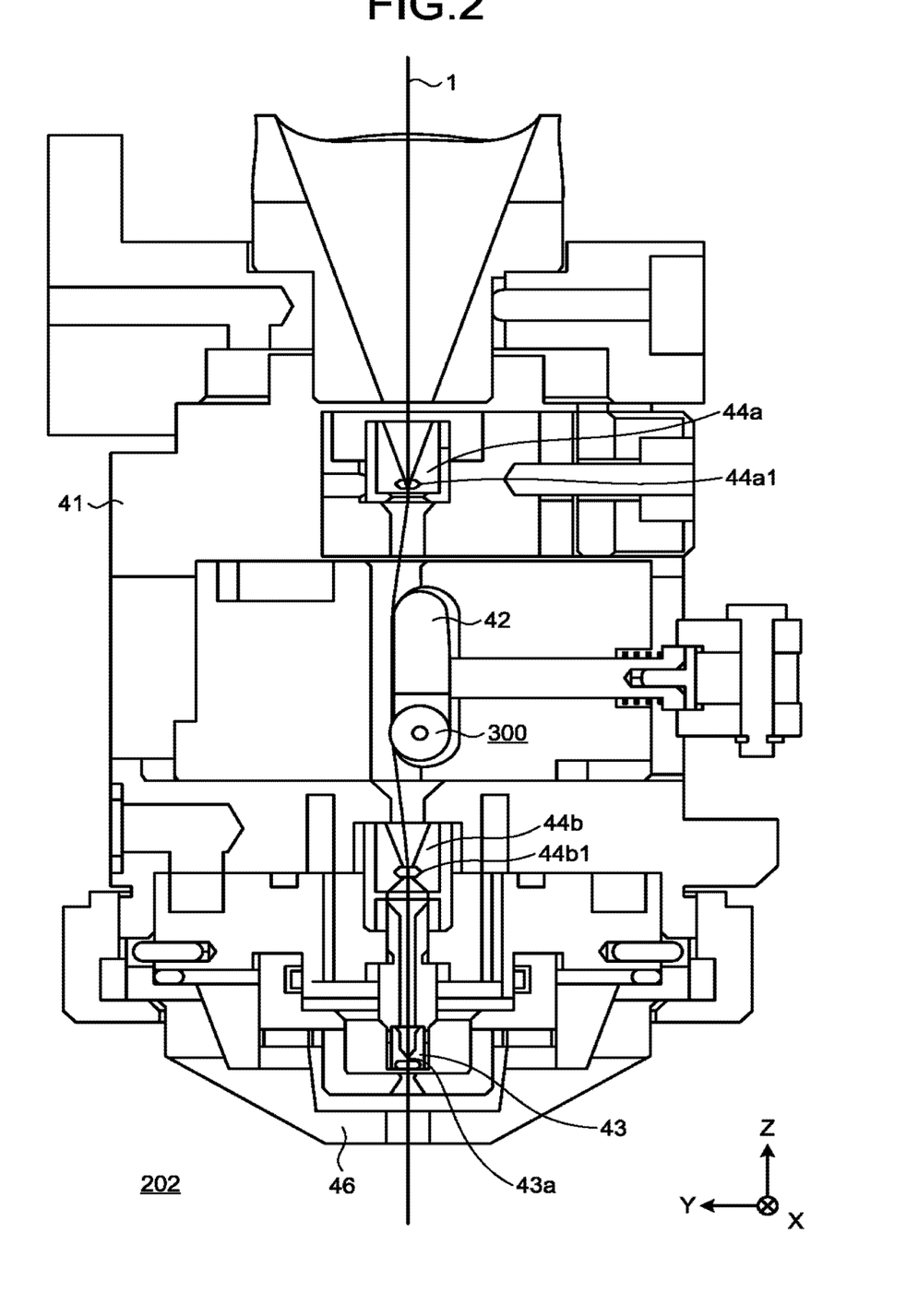
FIG. 2 is a cross-sectional view of an upper wire electrode guide unit illustrated in FIG. 1 as viewed in an X direction.
Figure 3:
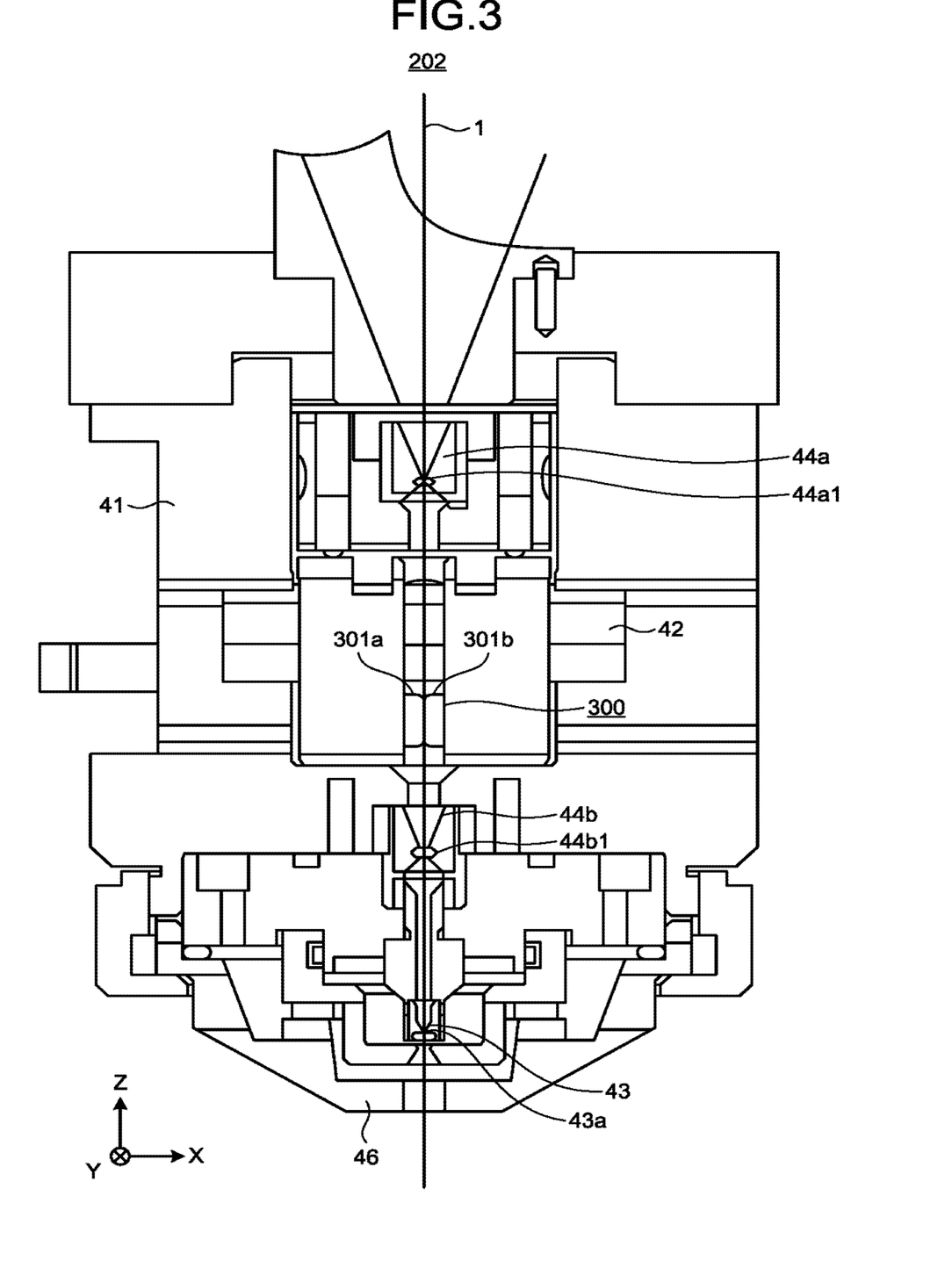
FIG. 3 is a cross-sectional view of the upper wire electrode guide unit illustrated in FIG. 1 as viewed in a Y direction.

FIG. 2 is a cross-sectional view of the upper wire electrode guide unit illustrated in FIG. 1 as viewed in the X direction. FIG. 3 is a cross-sectional view of the upper wire electrode guide unit illustrated in FIG. 1 as viewed in the Y direction. FIGS. 2 and 3 illustrate the wire electrode 1 fed into the upper wire electrode guide unit 202, and the wire guide device 300 provided between the upper feed element 42 and the upper guide 44b. The wire guide device 300 is provided in the middle of a path along which the wire electrode 1 is fed.

The upper guides 44a and 44b are dies having holes 44a1 and 44b1 that each provide a clearance larger than the diameter of the wire electrode 1. The size of each of the holes 44a1 and 44b1 may be 200 μm to 800 μm, for example. The upper die 43 is a die having a hole 43a that provides a minimum clearance necessary for sliding with respect to the outer diameter of the wire electrode 1. The size of the hole 43a may be 3 μm to 10 μm, for example. The upper feed element 42 is an electrode that applies an inter-electrode voltage to the wire electrode 1 while contacting the wire electrode 1, and the wire electrode 1 slides on a surface of the upper feed element 42.

Hereinafter, the X direction may be sometimes referred to as a +X direction, a direction opposite to the X direction as a −X direction, the Y direction as a +Y direction, and a direction opposite to the Y direction as a −Y direction. Directions in which the wire electrode 1 is pressed in each component of the upper wire electrode guide unit 202 illustrated in FIG. 2 are as follows.

(1) At the upper guide 44a, the wire electrode 1 is pressed against the inner surface of the hole 44a1 in the +Y direction.

(2) At the upper feed element 42, the wire electrode 1 is pressed against the sliding surface of the upper feed element 42 in the −Y direction.

(3) At the wire guide device 300, the wire electrode 1 is pressed against the sliding surface of the upper feed element 42, that is, a first wire guide roller 301a and a second wire guide roller 301b which are illustrated in FIG. 3 in the −Y direction.

(4) At the upper guide 44b, the wire electrode 1 is pressed against the inner surface of the hole 44b1 in the +Y direction.

(5) At the upper die 43, the wire electrode 1 is pressed against the inner surface of the hole 43a in the −Y direction.

On this occasion, the number of contact points between the component supporting the wire electrode 1 and the wire electrode 1 is one in the upper guide 44a, the number of the same is one or more than one in the Z direction in the upper feed element 42, the number of the same is one in the upper guide 44b, and the number of the same is one in the upper die 43. In the wire guide device 300, the number of the same is two in the X direction in each case of the first wire guide roller 301a and the second wire guide roller 301b illustrated in FIG. 3.

The wire guide device 300 according to the present embodiment prevents the wire electrode 1 from becoming off-course in the X direction, and the wire electrode 1 reaching the upper die 43 is limited in movement in the X direction and the Y direction. In the conventional art disclosed in Patent Literature 1 described above, which does not include a wire guide mechanism corresponding to the wire guide device 300 according to the present embodiment, the wire electrode 1 passing through inside of the upper wire electrode guide unit 202 is not limited in movement in the X direction, and has a state where the electrode 1 is unstable and tends to shake.

Figure 4:
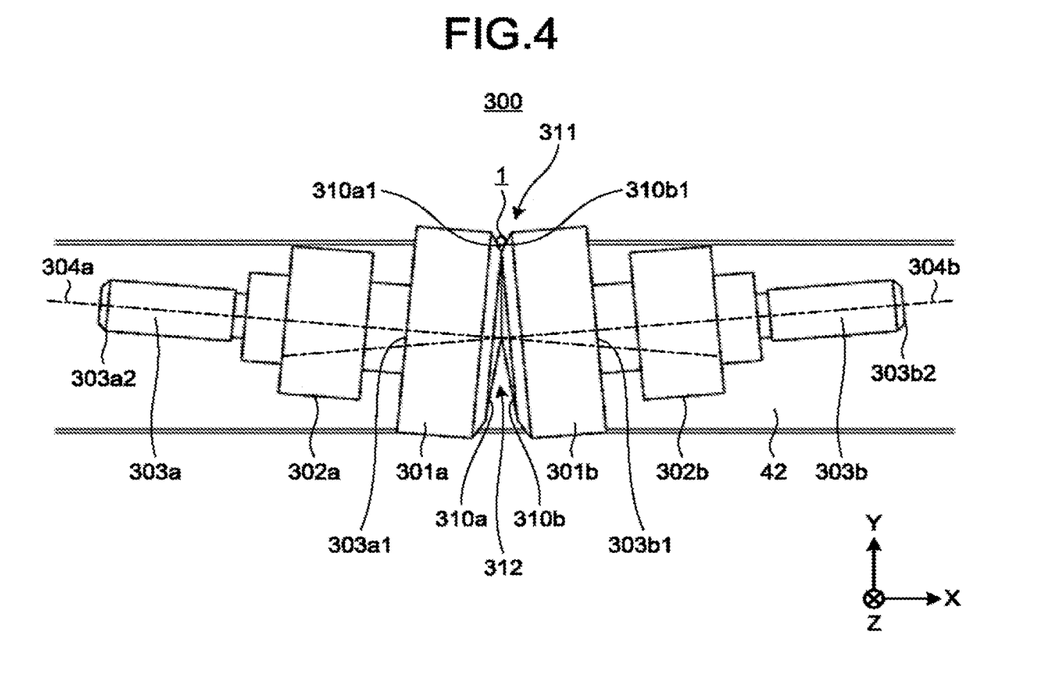
FIG. 4 is a cross-sectional view of the upper wire electrode guide unit illustrated in FIG. 1 as viewed in a Z direction.

FIG. 4 is a cross-sectional view of the upper wire electrode guide unit illustrated in FIG. 1 as viewed in the Z direction. The wire guide device 300 includes a first roller shaft 303a that rotates about a rotation axis 304a, the first wire guide roller 301a that is disposed coaxially with the first roller shaft 303a and provided at one end 303a1 of the first roller shaft 303a, and a first bearing 302a.

The first bearing 302a is disposed coaxially with the first roller shaft 303a and provided between another end 303a2 of the first roller shaft 303a and the first wire guide roller 301a, to rotatably support the first roller shaft 303a.

The wire guide device 300 also includes a second roller shaft 303b that rotates about a rotation axis 304b, the second wire guide roller 301b disposed coaxially with the second roller shaft 303b, and a second bearing 302b.

The second roller shaft 303b is disposed in such a manner that the rotation axis 304b intersects with the rotation axis 304a of the first roller shaft 303a at a certain angle. The second wire guide roller 301b is provided at one end 303b1 of the second roller shaft 303b. The second wire guide roller 301b has an opposing portion 310b that is an axial end face, a part of which is in contact with a part of an opposing portion 310a that is an axial end face of the first wire guide roller 301a. The part of the opposing portion 310b is an axial end face present radially inside from a conical surface 310b1. The part of the opposing portion 310a is an axial end face present radially inside from a conical surface 310a1.

The second bearing 302b is disposed coaxially with the second roller shaft 303b, and provided between another end 303b2 of the second roller shaft 303b and the second wire guide roller 301b, to rotatably support the second roller shaft 303b.

The first wire guide roller 301a and the second wire guide roller 301b have the conical surfaces 310a1 and 310b1, respectively, with which the wire electrode 1 is in contact, on their respective opposing portions 310a and 310b. The opposing portion 310a corresponds to an end face of the first wire guide roller 301a in the axial direction of the rotation axis 304a, and the opposing portion 310b corresponds to an end face of the second wire guide roller 301b in the axial direction of the rotation axis 304b.

The conical surface 310a1 is a surface having a fixed inclination angle with respect to the axial direction of the rotation axis 304a, and is formed by chamfering an end portion of the outer peripheral surface of the first wire guide roller 301a in the axial direction of the rotation axis 304a. The conical surface 310b1 is a surface having a fixed inclination angle with respect to the axial direction of the rotation axis 304b, and is formed by chamfering an end portion of the outer peripheral surface of the second wire guide roller 301b in the axial direction of the rotation axis 304b.

Thus, the wire guide device 300 includes the first wire guide roller 301a and the second wire guide roller 301b, which are two independent rotating mechanisms. The wire electrode 1 is pressed at the conical surface 310a1 of the first wire guide roller 301a in the +X direction and the −Y direction, and is pressed at the conical surface 310b1 of the second wire guide roller 301b in the −X direction and the −Y direction. Specifically, the conical surfaces 310a1 and 310b1 of the first wire guide roller 301a and the second wire guide roller 301b form a V-shaped groove 311 that restrains the outer peripheral surface of the wire electrode 1 having a cylindrical cross-sectional shape moving in the Z direction at two points in the X direction.

The first wire guide roller 301a and the second wire guide roller 301b are manufactured by machining a material having high electrical insulation property. The material may be ceramic, for example.

The first wire guide roller 301a and the second wire guide roller 301b are set such that their rotation axes 304a and 304b intersect with each other at a certain angle. The first wire guide roller 301a and the second wire guide roller 301b are in contact with each other at the parts of their respective opposing portions 310a and 310b, and rotate at the same speed.

Figure 5:
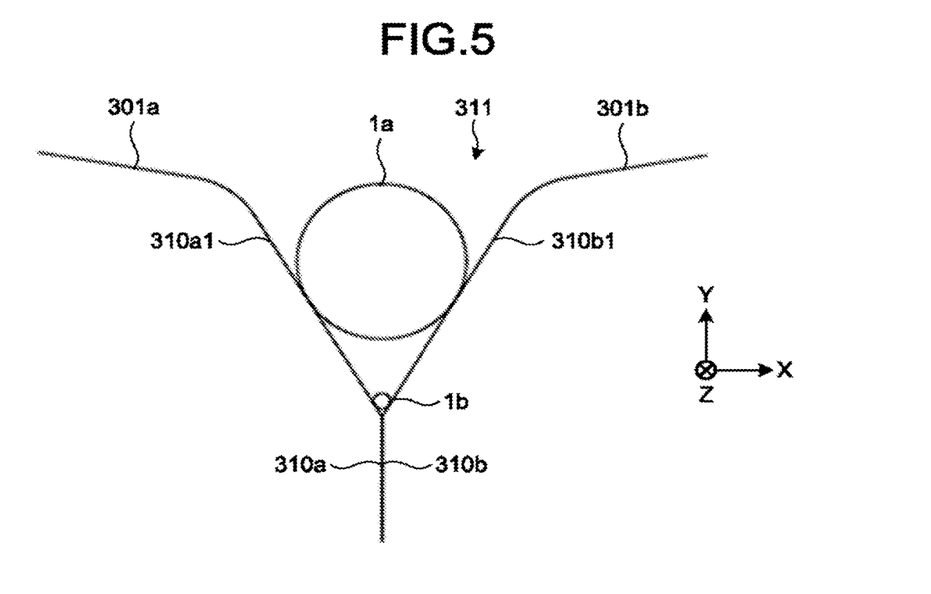
FIG. 5 is an enlarged view of a V-shaped groove illustrated in FIG. 4.

FIG. 5 is an enlarged view of the V-shaped groove illustrated in FIG. 4. FIG. 5 illustrates a standard wire electrode 1a for rough machining and an ultrafine wire electrode 1b for finish machining. The diameter of the standard wire electrode 1a may be 0.35 mm to 0.10 mm, for example. The diameter of the ultrafine wire electrode 1b may be 0.03 mm to 0.01 mm, for example.

The standard wire electrode 1a and the ultrafine wire electrode 1b are pressed against the groove 311 of the first wire guide roller 301a and the second wire guide roller 301b by a certain force based on the tension applied to both ends of each of the wire electrodes. Thus, the position of each of the standard wire electrode 1a and the ultrafine wire electrode 1b in the X direction is restrained at portions where the electrode is in contact with the groove 311. Further, the shake of the wire electrode generated in the middle of the feed path to the first wire guide roller 301a and the second wire guide roller 301b can be intercepted by the first wire guide roller 301a and the second wire guide roller 301b.

On the other hand, the diameter of the ultrafine wire electrode 1b is 0.03 mm to 0.01 mm as described above. Therefore, when the outer peripheral surface of a wire guide roller (not illustrated) is subjected to machining to form a groove having the same shape as the V-shaped groove 311, the machining requires to use a processing blade having a tip size of 15 μm to 5 μm. In practice, such machining is difficult.

The wire guide device 300 according to the present embodiment uses the first wire guide roller 301a and the second wire guide roller 301b facing each other as illustrated in FIG. 5, to form the V-shaped groove 311 by bringing their respective end portions in the axial directions of the rotation axes into contact. In this manner, the wire guide device 300 according to the present embodiment can relatively easily provide the groove 311 of 0.03 mm to 0.01 mm for guiding the ultrafine wire electrode 1b by causing the axial end faces of the two wire guide rollers to face each other.

In the wire guide device 300 according to the present embodiment, a conical surface constituting the V-shaped groove 311 is obtained by cutting a corner between the outer peripheral surface and an axial end face of a wire guide roller. Therefore, as compared with the case where a groove corresponding to the V-shaped groove 311 is formed in a central portion of the outer peripheral surface of a guide roller, a machined surface having high surface accuracy and high dimensional accuracy can be easily obtained, and the V-shaped groove 311 can be formed at low cost. Further, in the wire guide device 300, the conical surface 310a1 of the first wire guide roller 301a and the conical surface 310b1 of the second wire guide roller 301b form the V-shaped groove 311 with which the wire electrode 1 is in contact. Therefore, the wire guide device 300 is not limited by the diameter of the wire electrode 1, particularly the diameter of the ultrafine wire electrode 1b, and its applicable scope is widened.

As illustrated in FIG. 4, the second roller shaft 303b is disposed in such a manner that the rotation axis 304b intersects with the rotation axis 304a of the first roller shaft 303a at a certain angle. Therefore, between the first wire guide roller 301a and the second wire guide roller 301b, there are formed the groove 311 that is a first V-shaped groove formed by the conical surfaces 310a1 and 310b1 with which the wire electrode 1 is in contact, and a groove 312 that is a second V-shaped groove having an axial width larger than the width of the groove 311, with which the wire electrode 1 is not in contact. Since the axial width of the groove 312 is larger than the diameter of the standard wire electrode 1a, it is easy to remove minute machining dust adhering to the conical surfaces 310a1 and 310b1 serving as guide surfaces of the groove 311, and the connection between the groove 311 and the wire electrode 1 can be kept clean, machining dust that becomes a factor of shake during wire feed is removed, and a stable feed condition can be maintained.

The first wire guide roller 301a and the second wire guide roller 301b are configured to be movable in directions in which the rollers are uncoupled and get away from each other. This configuration allows the second wire guide roller 301b in contact with the first wire guide roller 301a to be separated from the first wire guide roller 301a. Also, the first wire guide roller 301a in contact with the second wire guide roller 301b can be separated from the second wire guide roller 301b. Consequently, a gap is formed between the first wire guide roller 301a and the second wire guide roller 301b.

When the conical surface 310a1 and the conical surface 310b1 are cleaned by blowing air or machining fluid on the surfaces during operation of the wire electrical discharge machine 100, the air or the machining fluid enters the gap between the conical surface 310a1 and the conical surface 310b1. A flow of the air or machining fluid that has entered the gap removes minute machining dust adhering to the conical surface 310a1 and the conical surface 310b1, so that the clean conical surfaces 310a1 and 310b1 are realized. Consequently, the connection of the wire electrode 1 to the conical surface 310a1 and the conical surface 310b1 of the groove 311 can be maintained satisfactorily. That is, machining dust that becomes a factor of shake during wire feed is removed, and so a stable feed condition can be maintained.

Figure 10:
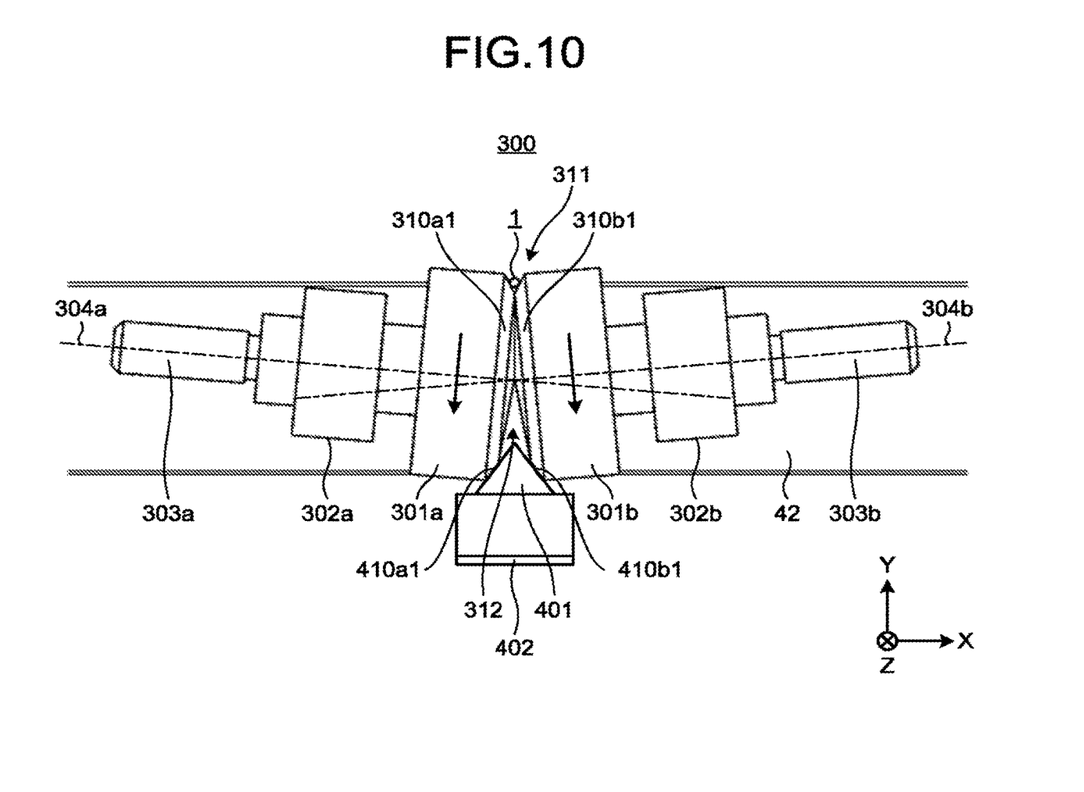
FIG. 10 is a cross-sectional view of a state in which a wiping part is provided to the upper wire electrode guide unit illustrated in FIG. 4, as viewed in the Z direction.

FIG. 10 is a cross-sectional view of a state in which the upper wire electrode guide unit illustrated in FIG. 4 is provided with a wiping part, as viewed in the Z direction. The wire guide device 300 illustrated in FIG. 10 includes a wiping part 401 and an urging member 402 that applies an urging force to the wiping part 401 to press the wiping part 401 against the groove 312. The urging member 402 may be a coil spring or a leaf spring, for example. The urging member 402 is fixed to a component (not illustrated) constituting the wire guide device 300. Note that the urging member 402 is not limited to a coil spring or a leaf spring as long as it is a member capable of applying an urging force to the wiping part 401.

The wiping part 401 is made of a felt material, and is a member of a triangular shape in cross section on an X-Y plane when the wiping part 401 is planarly viewed in the Z-axis direction. The shape of the wiping part 401 may be a triangular pyramid or a triangular prism, for example. Of the three apexes of the wiping part 401, one apex enters the groove 312, and two side parts sandwiching apex form cleaning surfaces 410a1 and 410b1. The cleaning surface 410a1 is in contact with the conical surface 310a1 that is a surface to be cleaned of the first wire guide roller 301a. The cleaning surface 410b1 is in contact with the conical surface 310b1 that is a surface to be cleaned of the second wire guide roller 301b. Note that the material of the wiping part 401 is not limited to a felt material as long as it can wipe the conical surface 310a1 and the conical surface 310b1 as surfaces to be cleaned. Further, the cross-sectional shape of the wiping part 401 on an X-Y plane is not limited to a triangular shape as long as it is a shape that allows the wiping of the conical surface 310a1 and the conical surface 310b1.

Even when the first wire guide roller 301a and the second wire guide roller 301b are in a wire feed state during operation of the wire electrical discharge machine 100, the use of the wiping part 401 can remove minute machining dust adhering to the conical surface 310a1 and the conical surface 310b1, thereby realizing the clean conical surfaces 310a1 and 310b1. Consequently, the connection of the wire electrode 1 to the conical surface 310a1 and the conical surface 310b1 of the groove 311 can be maintained satisfactorily. That is, machining dust that becomes a factor of shake during wire feed is removed, and thus a stable feed condition can be maintained.

Figure 6:
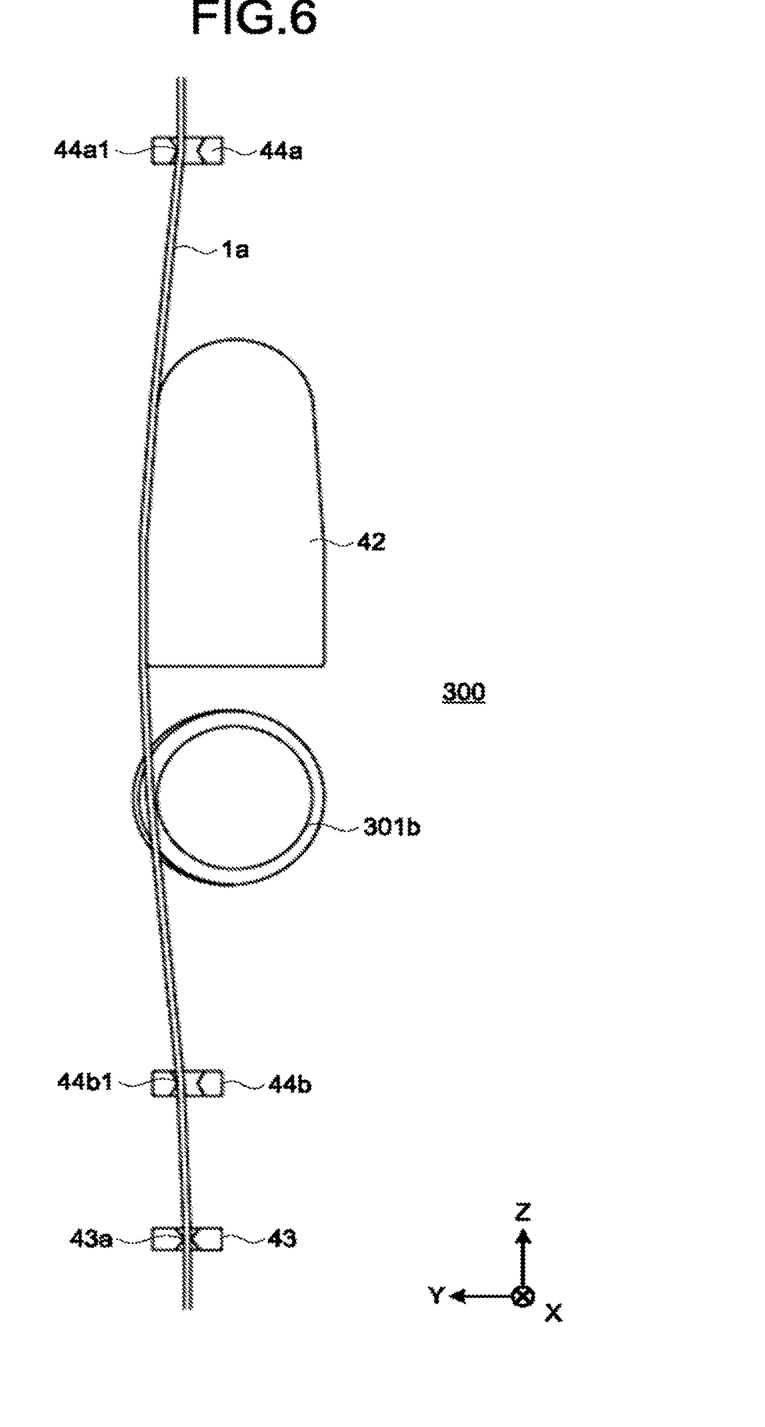
FIG. 6 is a view of a state in which a standard wire electrode runs across the wire guide device illustrated in FIG. 1 when a workpiece is subjected to rough machining, as viewed in the X direction.
Figure 7:
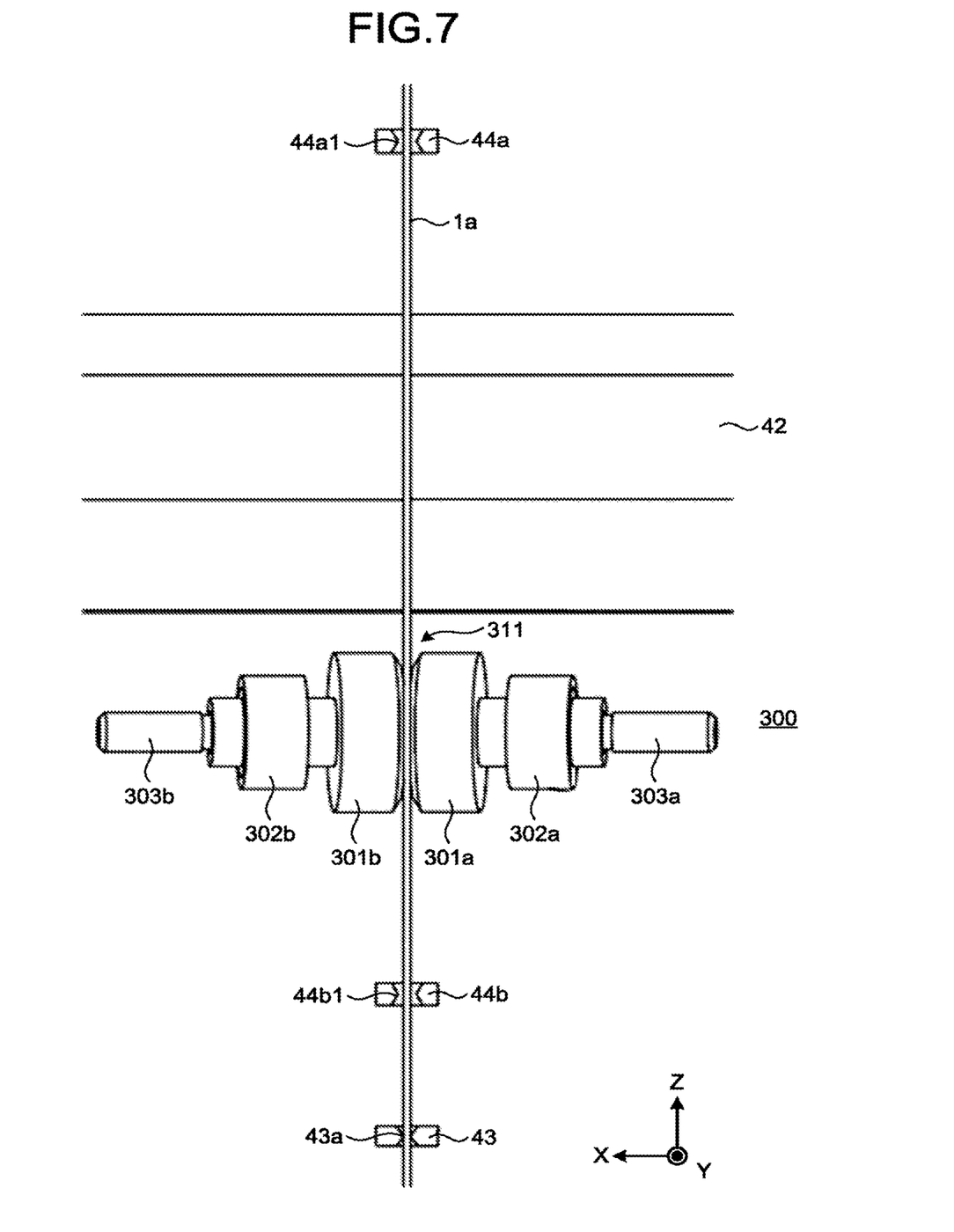
FIG. 7 is a view of the state in which the standard wire electrode runs across the wire guide device illustrated in FIG. 1 when a workpiece is subjected to rough machining, as viewed in the Y direction.

FIG. 6 is a diagram of a state in which the standard wire electrode runs across the wire guide device illustrated in FIG. 1 when a workpiece is subjected to rough machining, as viewed in the X direction. FIG. 7 is a diagram of the state in which the standard wire electrode runs across the wire guide device illustrated in FIG. 1 when a workpiece is subjected to rough machining, as viewed in the Y direction. FIG. 6 illustrates the second wire guide roller 301b of the two wire guide rollers illustrated in FIG. 4, the first wire guide roller 301a and the second wire guide roller 301b.

This example is based on an assumption that tension matching a machining condition of the workpiece 51 is applied to both ends of the standard wire electrode 1a illustrated in FIGS. 6 and 7. The standard wire electrode 1a is pressed against the upper guides 44a and 44b and the hole 43a of the upper die 43 in the +Y direction. Further, the standard wire electrode 1a becomes in a state where the electrode is pressed against the upper feed element 42 and the groove 311 in the −Y direction.

The number of support points at which the standard wire electrode 1a is supported are as follows. The surface of the upper feed element 42 has no restraining force in the X direction because of improving a sliding property.

(1) In the upper guides 44a and 44b and the upper die 43, there is one support point on the inner surface of each of the holes 44a1, 44b1, and 43a in the +Y direction.

(2) In the groove 311, there are two support points in the X direction.

The upper die 43 and the subsequent portions serve as an electrical discharge machining area with the workpiece 51, and thus the shake of the standard wire electrode 1a becomes a factor of displacement of the machining electrode and degrades machining accuracy. Therefore, it is necessary to configure the feed mechanism so as to prevent the shake of the electrode in the electrical discharge machining area.

By providing the first wire guide roller 301a and the second wire guide roller 301b as described above, shake components in the X direction are intercepted by the V-shaped groove 311. Further, by restraint at total three contacts including two contacts aligned with the V-shaped groove 311 in the X direction and one contact of the upper guide 44b, the shake of the standard wire electrode 1a fed therebetween is limited, and thus a shake prevention effect is obtained in the electrical discharge machining area with the workpiece 51 at and after the upper die 43.

Figure 8:
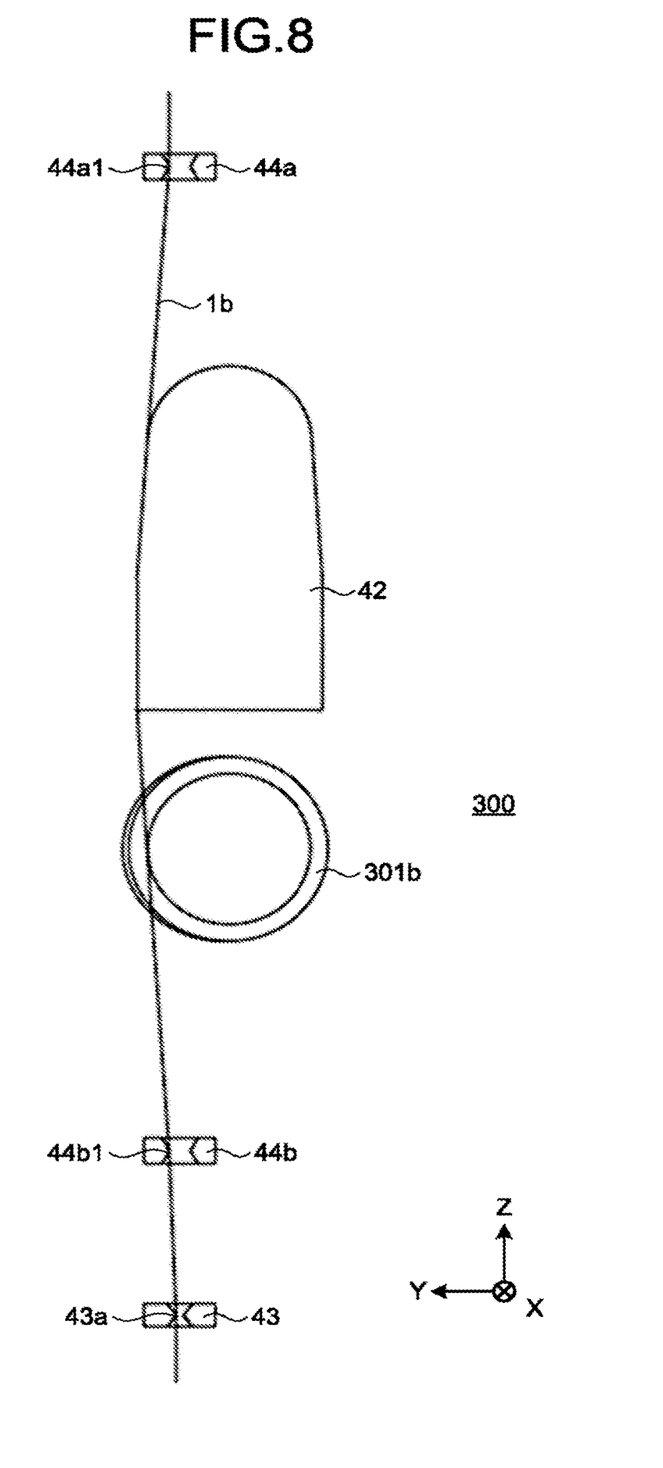
FIG. 8 is a view of a state in which an ultrafine wire electrode runs across the wire guide device illustrated in FIG. 1 when a workpiece is subjected to finish machining, as viewed in the X direction.
Figure 9:
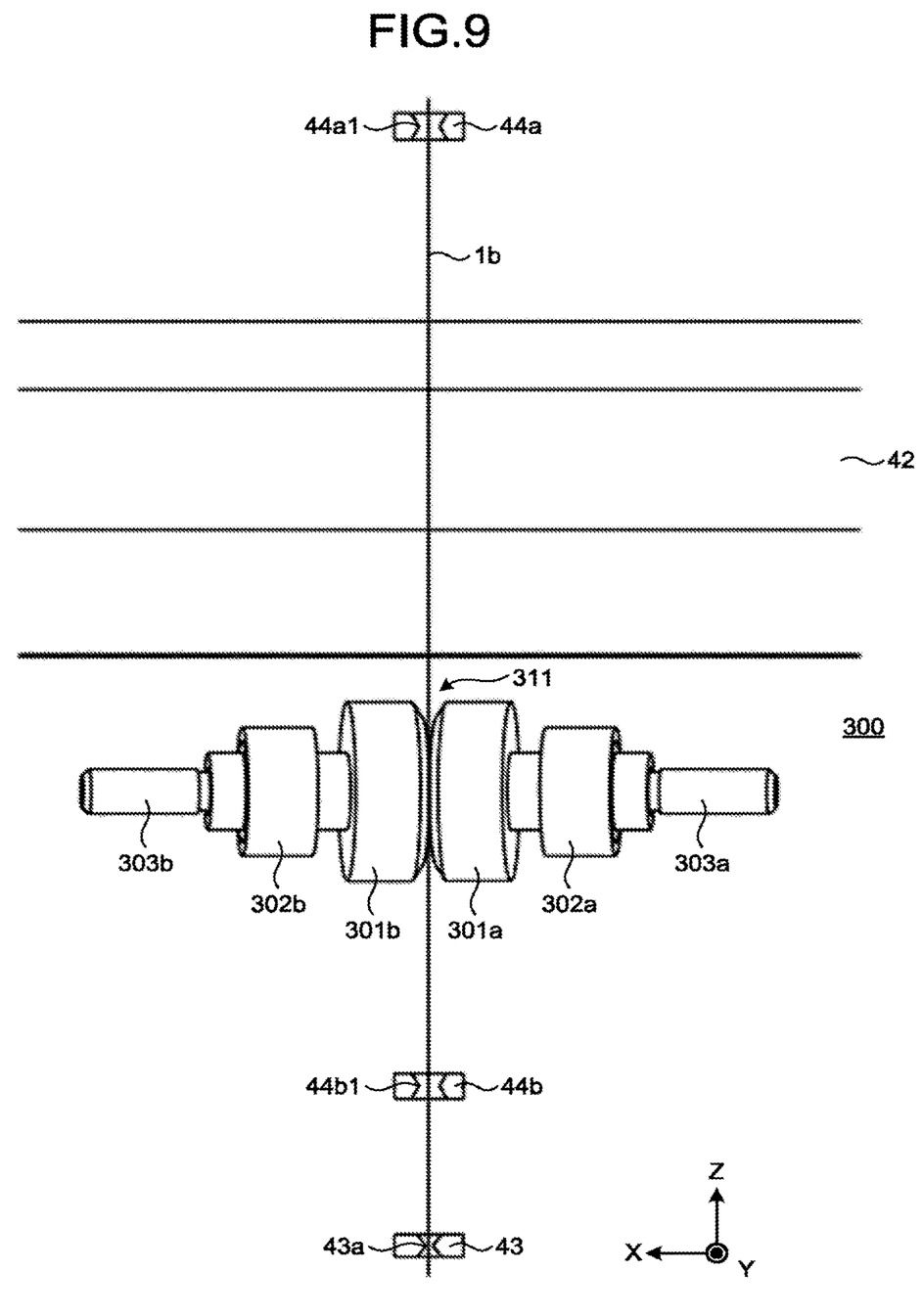
FIG. 9 is a view of the state in which the ultrafine wire electrode runs across the wire guide device illustrated in FIG. 1 when a workpiece is subjected to finish machining, as viewed in the Y direction.

FIG. 8 is a diagram of a state in which the ultrafine wire electrode runs across the wire guide device illustrated in FIG. 1 when a workpiece is subjected to finish machining, as viewed in the X direction. FIG. 9 is a diagram of the state in which the ultrafine wire electrode runs across the wire guide device illustrated in FIG. 1 when a workpiece is subjected to finish machining, as viewed in the Y direction. FIG. 8 illustrates the second wire guide roller 301b of the two wire guide rollers illustrated in FIG. 4, the first wire guide roller 301a and the second wire guide roller 301b.

This example is based on an assumption that tension corresponding to a machining condition of the workpiece 51 is applied to both ends of the ultrafine wire electrode 1b illustrated in FIGS. 8 and 9. The ultrafine wire electrode 1b is pressed against the upper guides 44a and 44b and the hole 43a of the upper die 43 in the +Y direction. Further, the ultrafine wire electrode 1b becomes in a state where the electrode 1b is pressed against the upper feed element 42 and the groove 311 in the −Y direction.

The number of support points at which the ultrafine wire electrode 1b is supported is as follows. The surface of the upper feed element 42 has no restraining force in the X direction because of improving a sliding property.

(1) In the upper guides 44a and 44b and the upper die 43, there is one support point on the inner surface of each of the holes 44a1, 44b1, and 43a in the +Y direction.

(2) In the groove 311, there are two support points in the X direction.

The upper die 43 and the subsequent portions serve as an electrical discharge machining area with the workpiece 51, and thus the shake of the ultrafine wire electrode 1b becomes a factor of displacement of the machining electrode and degrades machining accuracy. Therefore, it is necessary to configure the feed mechanism so as to prevent the shake of the electrode in the electrical discharge machining area.

By providing the first wire guide roller 301a and the second wire guide roller 301b as described above, shake components in the X direction are intercepted by the V-shaped groove 311. Further, by restraint at total three contacts including two contacts aligned in the X direction with the V-shaped groove 311 and one contact with the upper guide 44b, the shake of the ultrafine wire electrode 1b fed therebetween is limited, and thus an effect of preventing shake with the workpiece 51 is achieved in the electrical discharge machining area on and after the upper die 43.

As described above, the upper die 43 is a diamond die having the hole 43a that provides a clearance of 3 μm to 10 μm that is necessary for sliding with respect to the outer diameter of the standard wire electrode 1a to be used during rough machining. Even when the switch to the ultrafine wire electrode 1b to be used during finish machining is made, the wire guide device 300 according to the present embodiment can adapt the upper die 43 to the ultrafine wire electrode 1b to continuously perform electrical discharge machining without a change to a dedicated diamond die by virtue of using the effect of the three-point restraint based on the feed mechanism.

Further, as described above, regardless of the diameter of the wire electrode 1 used, the first wire guide roller 301a and the second wire guide roller 301b according to the present embodiment can 3-point restrain the wire electrode 1 currently being fed, and the effect of preventing the shake of the wire electrode in the electrical discharge machining area remains unchanged.

Introducing the wire guide device 300 according to the present embodiment to the feed mechanism eliminates the need to change a component such as the guide, the die, or the feed element constituting the feed mechanism, when the wire electrode to be fed is changed, and allows continuous electrical discharge machining without stopping mechanical devices/equipment.

The first roller shaft 303a and the second roller shaft 303b are in contact with each other at parts of their respective opposing portions 310a and 310b, and equally rotate at the same speed. This configuration allows the V-shaped groove 311 in contact with the wire electrode 1 to be rotated at the same speed, and allows the wire electrode 1 to be stably fed.

The configuration illustrated in the above embodiment illustrates an example of the subject matter of the present invention, and can be combined with other publicly known techniques and partly omitted and/or modified without departing from the scope of the present invention.

REFERENCE SIGNS LIST 1 wire electrode; 1a standard wire electrode; 1b ultrafine wire electrode; 11 wire electrode bobbin; 12a, 12b, 12c, 12d, 12e pulley; 21 feed roller; 22a, 22b feed pinch roller; 41 upper guide block; 42 upper feed element; 43 upper die; 44a, 44b upper guide; 44a1, 44b1, 43a hole; 46 upper machining fluid nozzle; 51 workpiece; 62 lower feed element; 63 lower die; 64 lower guide; 65 lower machining fluid nozzle; 67 lower guide block; 71 lower roller block; 72 lower roller; 73 aspirator; 74 lower guide pipe; 81a, 81b wire electrode collection roller; 82 collection pipe end; 100 wire electrical discharge machine; 201 wire electrode holding unit; 202 upper wire electrode guide unit; 203 wire electrode automatic connection device; 204 lower wire electrode guide unit; 205 wire electrode feed unit; 206 wire electrode collection unit; 300 wire guide device; 301a first wire guide roller; 301b second wire guide roller; 302a first bearing; 302b second bearing; 303a first roller shaft; 303a1, 303b1 one end; 303a2, 303b2 another end; 303b second roller shaft; 304a, 304b rotation axis; 310a, 310b opposing portion; 310a1, 310b1 conical surface; 311, 312 groove; 401 wiping part; 402 urging member; 410a1, 410b1 cleaning surface.

The invention claimed is:

1. A wire guide device of a wire electrical discharge machine, comprising:
a first roller shaft;
a first wire guide roller disposed coaxially e first roller shaft and provided at an end of the first roller shaft;
a second roller shaft; and
a second wire guide roller disposed coaxially with the second roller shaft and provided at an end of the second roller shaft, the second wire guide roller having an end face in an axial direction provided to face an end face of the first wire guide roller in the axial direction,
wherein the first wire guide roller and the second wire guide roller each have a conical surface with which a wire electrode is in contact.

2. The wire guide device of the wire electrical discharge machine according to claim 1, wherein the conical surface of the first wire guide roller and the conical surface of the second wire guide roller form a V-shaped groove with which the wire electrode is in contact.

3. The wire guide device of the wire electrical discharge machine according to claim 2, wherein the first and second roller shafts are in contact with each other at parts of their respective opposing portions, and rotate at the same speed.

4. The wire guide device of the wire electrical discharge machine according to claim 1,
wherein the first wire guide roller and the second wire guide roller are disposed in a manner that their respective rotation axes intersect with each other at a determined angle, and
a first V-shaped groove formed by the conical surfaces with which the wire electrode is in contact, and a second V-shaped groove whose width in the axial direction is larger than a width of the first groove, the second groove having no contact with the wire electrode, are formed between the first wire guide roller and the second wire guide roller.

5. The wire guide device of the wire electrical discharge machine according to claim 4, wherein the first and second roller shafts are in contact with each other at parts of their respective opposing portions, and rotate at the same speed.

6. The wire guide device of the wire electrical discharge machine according to claim 1, wherein the first and second roller shafts are in contact with each other at parts of their respective opposing portions, and rotate at the same speed.

7. The wire guide device of the wire electrical discharge machine according to claim 1, wherein the first wire guide roller and the second wire guide roller are configured to be displaceable in directions away from each other.

8. The wire guide device of the wire electrical discharge machine according to claim 1, further comprising a wiping part to contact the conical surfaces of the first wire guide roller and the second wire guide roller.

9. A wire electrical discharge machine, comprising:
the wire guide device according to claim 1; and
a wire electrode bobbin configured to hold the wire electrode.

10. The wire electrical discharge machine according to claim 9, wherein the conical surface of the first wire guide roller and the conical surface of the second wire guide roller form a V-shaped groove with which the wire electrode is in contact.

11. The wire electrical discharge machine according to claim 10, wherein the first and second roller shafts are in contact with each other at parts of their respective opposing portions, and rotate at the same speed.

12. The wire electrical discharge machine according to claim 9,
    wherein the first wire guide roller and the second wire guide roller are disposed in a manner that their respective rotation axes intersect with each other at a determined angle, and
    a first V-shaped groove formed by the conical surfaces with which the wire electrode is in contact, and a second V-shaped groove whose width in the axial direction is larger than a width of the first groove, the second groove having no contact with the wire electrode, are formed between the first wire guide roller and the second wire guide roller.

13. The wire electrical discharge machine according to claim 12, wherein the first and second roller shafts are in contact with each other at parts of their respective opposing portions, and rotate at the same speed.

14. The wire electrical discharge machine according to claim 9, wherein the first and second roller shafts are in contact with each other at parts of their respective opposing portions, and rotate at the same speed.

15. The wire electrical discharge machine according to claim 9, wherein the first wire guide roller and the second wire guide roller are configured to the displaceable in directions away from each other.

16. The wire electrical discharge machine according to claim 9, further comprising a wiping part to contact the conical surfaces of the first wire guide roller and the second wire guide roller.

* * * * *